US008736996B2

(12) United States Patent
Che et al.

(10) Patent No.: US 8,736,996 B2
(45) Date of Patent: May 27, 2014

(54) IMPLEMENTING CHANNEL SIGNAL PROCESSING ASSIST WITH ECS CONTACT DETECTION

(75) Inventors: Xiaodong Che, Saratoga, CA (US); Weldon Mark Hanson, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 82 days.

(21) Appl. No.: 13/475,787

(22) Filed: May 18, 2012

(65) Prior Publication Data

US 2013/0308220 A1  Nov. 21, 2013

(51) Int. Cl.
*G11B 27/36* (2006.01)
*G11B 5/09* (2006.01)
*G11B 21/02* (2006.01)

(52) U.S. Cl.
USPC .................................. 360/31; 360/46; 360/75

(58) Field of Classification Search
None
See application file for complete search history.

(56) References Cited

U.S. PATENT DOCUMENTS

| 4,777,544 | A | 10/1988 | Brown et al. |
| 5,168,413 | A | 12/1992 | Coker et al. |
| 6,088,176 | A | 7/2000 | Smith et al. |
| 7,929,235 | B2 | 4/2011 | Meier et al. |
| 2010/0128380 | A1 | 5/2010 | Tang et al. |
| 2011/0157740 | A1 | 6/2011 | Baumgart et al. |
| 2013/0155538 | A1* | 6/2013 | Contreras ........................ 360/46 |

OTHER PUBLICATIONS

U.S. Appl. No. 13/277,047, filed Oct. 19, 2011 by Richard Leo Galbraith et al., entitled Implementing Magnetic Defect Classification Using Phase Modulation.
"Disk Drive With Multiplexed Read Signal and Fly-Height Signal for Fly-Height Monitoring During Writing" by Weldon Hanson and Xiaodong Che, U.S. Appl. No. 13/331,688, filed Dec. 20, 2011.

* cited by examiner

*Primary Examiner* — Regina N Holder
(74) *Attorney, Agent, or Firm* — Joan Pennington

(57) ABSTRACT

A method, apparatus, and system for implementing channel signal processing assist with an embedded contact sensor (ECS) in hard disk drives. An ECS signal is captured during write and idle operation of the hard disk drive. A read channel monitors changes in the ECS signal providing a clearance monitor function for insuring write integrity.

17 Claims, 9 Drawing Sheets

IMPLEMENTING CHANNEL SIGNAL PROCESSING ASSIST WITH ECS CONTACT DETECTION

FIELD OF THE INVENTION

The present invention relates generally to the data storage field, and more particularly, relates to a method, apparatus, and system for implementing channel signal processing assist with an embedded contact sensor (ECS) in hard disk drives (HDDs).

DESCRIPTION OF THE RELATED ART

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs).

A magnetic-recoding head in hard disk drives typically includes a read sensor and a write element or write pole. Typically magnetoresistive (MR) sensors are used to sense magnetic patterns of data recorded on a writable disk surface. MR sensors detect the magnetic field strength changes (AH) experienced by the magnetic sensor while passing over magnetically written bits on the spinning magnetic disk media, and directly convert the detected DH to an electrical signal with a time-varying voltage level ($\Delta V$), which can be converted into data bits by the read channel electronics.

Reduced magnetic spacing between the disk media and the head continues to be highly important to accommodate increased media areal densities in magnetic recording.

A significant limitation in current magnetic recording is related to reducing transition jitter for which reducing spacing is an important parameter. Noise in the read back signal is typically 90-95% media noise in present drives indicating that to increase density, one is required to reduce the noise component of the media, independent of read spacing or electronic signal-to-noise-ratio (SNR). Transition jitter is a function of the write field gradient of the head together with media properties of coercivity, grain size, cluster size, and thickness.

Traditionally, reducing grain size is enabled by increasing media coercivity requiring stronger write gradient from the head while scaling down the write head dimensions and spacing. Present technology for perpendicular media construction includes many layers, of which some are considered the magnetic layers with isolation of magnetic grains and having exchange layers to thermally stabilize and isolate of the grains in each magnetic layer. The perpendicular media also contains a soft underlayer which provides the return path for flux from the write pole tip.

A need exists for effective mechanism for implementing channel signal processing to reduce magnetic write spacing and reduced thermal flying-height control (TFC) pullback spacing and achieve higher areal density. It is desirable to provide such mechanism to allow for efficient and effective contact monitoring during the write process substantially without negative effect.

SUMMARY OF THE INVENTION

Aspects of the present invention are to provide a method, apparatus, and system for implementing channel signal processing assist with an embedded contact sensor (ECS) in hard disk drives. Other important aspects of the present invention are to provide such method, apparatus, and system substantially without negative effect and to overcome some of the disadvantages of prior art arrangements.

In brief, a method, apparatus, and system for implementing channel signal processing assist with an embedded contact sensor (ECS) in hard disk drives. An ECS signal is captured during write and idle operation of the hard disk drive. A read channel monitors changes in the ECS signal providing a clearance monitor function for insuring write integrity.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the embodiments of the invention, a method, apparatus, and system for implementing channel signal processing assist with an embedded contact sensor (ECS) for contact detection in hard disk drives (HDDs) are provided. The system implements channel signal processing assist with reduced magnetic write spacing to reduce thermal flying-height control (TFC) pullback spacing and achieve higher areal density, using the ECS for efficient and effective contact monitoring during the write process. An ECS signal is captured during write and idle operation of a hard disk drive. A read channel monitors changes in the ECS signal providing a clearance monitor function, defect classification, and complete characterization of surface topology around defects for insuring write integrity.

Figure 1:
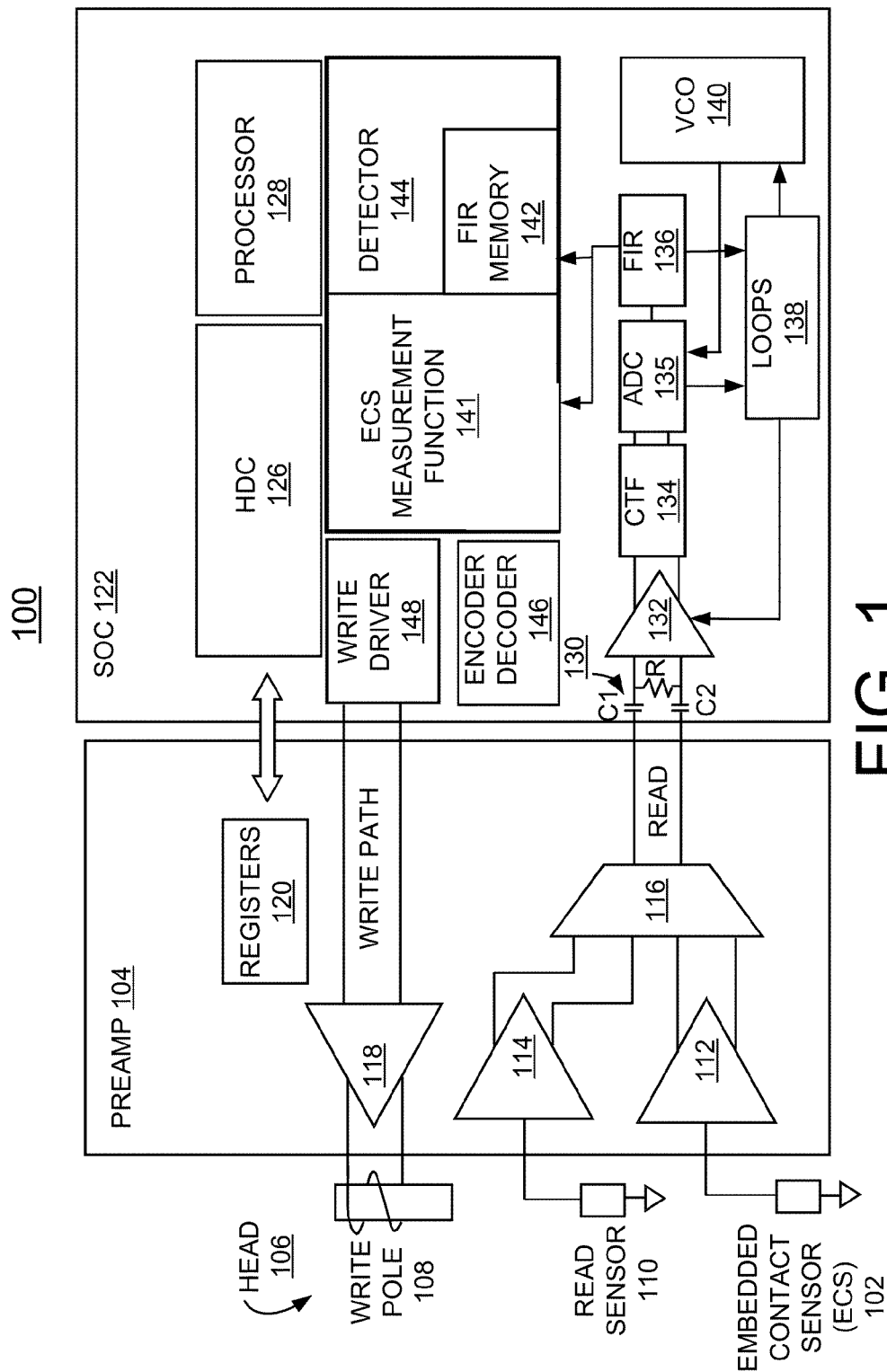
FIG. 1 is a block diagram representation illustrating a system for implementing channel signal processing assist with an embedded contact sensor (ECS) for hard disk drives (HDDs) in accordance with an embodiment of the invention.

Having reference now to the drawings, in FIG. 1, there is shown a system generally designated by the reference character 100 for implementing channel signal processing assist with an embedded contact sensor (ECS) 102 for hard disk drives (HDDs) in accordance with an embodiment of the invention.

System 100 includes a preamplifier (preamp) 104 coupled to a magnetic recording head 106 including a write pole 108, a read sensor 110 and the embedded contact sensor (ECS) 102. The magnetic recording head 106 contains ECS sensor 102 in a trailing edge of an air bearing surface (ABS) with the ECS sensor changing resistance as a function of temperature when the head 106 contacts the disk media.

In accordance with features of the embodiments of the invention, the preamp 104 provides sense current and amplification, outputs voltage representing ECS resistance differentially across read lines to the read channel. Multiplexer circuitry exists in preamp 104 allowing ECS monitoring in the preamp with a single ended or differential output. System 100 of the preferred embodiments of the invention uses the differential output of the preamp 104 as the input to the read channel which avoids the ground differences and transient behavior of a single ended solution.

The magnetic recording head 106 is coupled to a signal multiplexer circuit of the preamplifier 104 which includes an amplifier 112 coupled to the ECS 102 and an amplifier 114 coupled to the read sensor 110, and a multiplexer 116. The amplified ECS signal output of amplifier 112 and the amplified read signal output of amplifier 114 are applied to a respective input of the multiplexer 116. The preamp 104 typically contains current source and sensing circuitry to provide the means to detect change in ECS sensor resistance which may be due to cooling by proximity to the disk surface or by heating due to contact.

The preamplifier 104 includes an amplifier 118 in a write path that is coupled to the write pole 108 of the magnetic recording head 106. The preamplifier 104 includes multiple registers 120 coupled to a system on a chip (SOC) 122 of the hard disk drive system 100. The SOC 122 includes a hard drive controller (HDC) 126 and a processor 128.

The output of a multiplexer 116 provides a differential read input to a read channel of the SOC 122 that is applied to a high pass filter generally designated by the reference character 130 defined by a pair of series capacitors C1, C2 and a resistor R coupled between the series capacitors C1, C2. The high pass filter 130 is coupled to an amplifier 132 having an output coupled to a bandpass filter or continuous time filter (CTF) 134.

An analog-to-digital converter (ADC) 135 receives the filtered output of the CTF 134 and applies an input to a finite-impulse-response (FIR) filter 136 and feedback loops 138 coupled to the input amplifier 132 and coupled to a voltage controlled oscillator (VCO) 140. The VCO 140 provides a VCO clock to the ADC 135 for sample capture. The FIR filter 136 is coupled an ECS measurement logic function 141 and a FIR memory 142 provided with a detector 144 of the preferred embodiment. The SOC 122 includes an encoder decoder 146 and a write driver 148 providing a differential input to a write path of the preamplifier 104.

In accordance with features of the embodiments of the invention, read channel of the SOC 122 contains differential input path, filters 130, 134, ADC 135, FIR 136, and logic of detector 144 is constructed to sample and monitor change in ECS resistance of the captured ECS signal. In addition to input high pass filter 130 and low pass filter or CTF 134, logic in channel and SOC microprocessor 128 provides signal processing capability and FIR memory 142 access provides waveform ADC capture capability. Conventional flex tape wiring between SOC 122 and preamp 104 is used to transfer ECS waveform to channel.

In accordance with features of the embodiments of the invention, with the high pass filter 130 at the read channel input, transmission of the ECS signal directly to read channel results in loss of DC. Preamp 104 to channel read back signal path generally contains high pass series capacitors, such as capacitors C1, C2 which form the high pass filter 130, which typically remove information below ~200 KHz, while for ECS signal monitoring, the high pass setting advantageously is optimized for detection, for example, in a range of 200 KHz to 1 MHz.

In accordance with features of an embodiment of the invention, processing of ECS values includes the use of the ADC 135 or FIR 136 sample capture into the FIR memory 142 to obtain the localized waveform capture of the ECS signal which is then used for defect classification purposes. The capture and processing of the waveform data in this case typically involves off-line processing using the microprocessor 128 to analyze the waveshape characteristic. Preferentially the high pass filter 130 is set to a lower frequency, such as about 200 KHz, then capturing the signal using a relatively high sampling rate into the FIR memory 142, for example, meaning a sufficiently high sampling rate to capture the harmonics of the waveform.

In accordance with features of another embodiment of the invention, processing of ECS values includes the use of logic processing a bandpass filtered version of the waveform, roughly 200 KHz-3 MHz region, around the revolution to obtain the envelope or RMS measure of noise for detection of the contact to the disk media. This ECS envelope is obtained by adjustment of the input high pass filter 130 and low pass filter 134 by CTF cutoff and digital averaging in the ECS measurement logic function 141. This uses the ADC 135 or FIR 136 signal, but requires the separate ECS detection logic function 141 to be able to process the sampled waveform in a real time usage to extract the ECS information such as, envelope, peak to peak amplitude, or RMS error.

In accordance with features of the embodiments of the invention, to allow for continuous monitoring by transfer of ECS values to the channel, there exists a requirement for time allocations for transmission of a reference level along with the sampled ECS waveform at rate sufficient to avoid signal decay through the read channel's input high pass filter. A reference is added into the preamp's multiplexer path to accommodate the capture of a delta voltage by the channel corresponding to the ECS level, for example, using an example ECS signal multiplexer circuit as illustrated and described with respect to FIG. 2.

Figure 2:
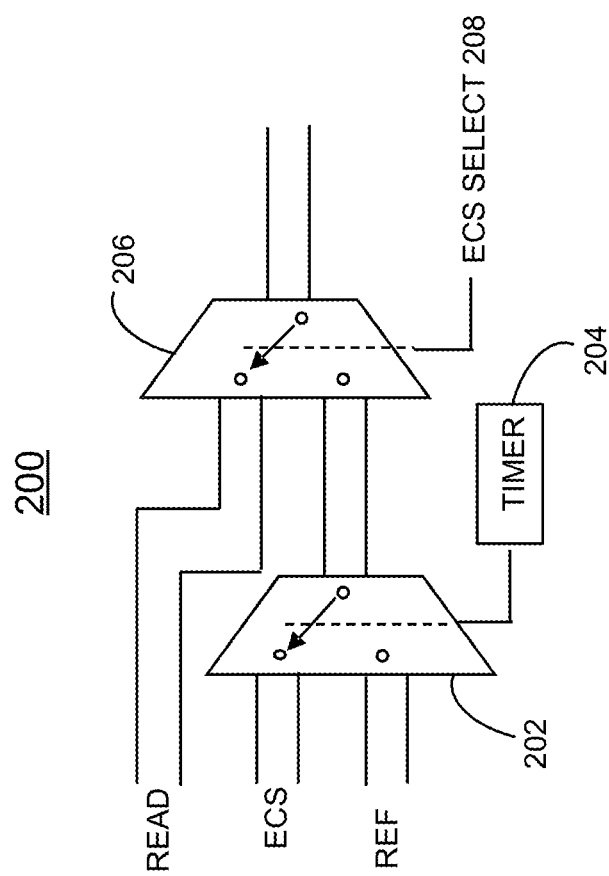
FIG. 2 is a block diagram representation illustrating an example ECS signal multiplexer circuit of the system of FIG. 1 in accordance with an embodiment of the invention.

Referring now to FIG. 2, there is shown an example ECS signal multiplexer circuit generally designated by the reference character 200 of the system 100 in accordance with an embodiment of the invention. ECS signal multiplexer circuit 200 includes a first multiplexer 202 receiving the ECS signal labeled ECS and a reference signal labeled REF. The reference signal REF provides a way to reference a DC level from the preamp 104 to accommodate the capture of a delta voltage by the read channel corresponding to the ECS level. A timer 204 is coupled to the first multiplexer 202 providing a multiplexer select input selecting between the ECS signal and the reference signal. The read signal and the output of the first multiplexer 202 are applied to a respective input of a second multiplexer 206. An ECS select input 208 is applied to the second multiplexer 206 selecting between the read signal and the sampled ECS output of the first multiplexer 202.

Figure 3:
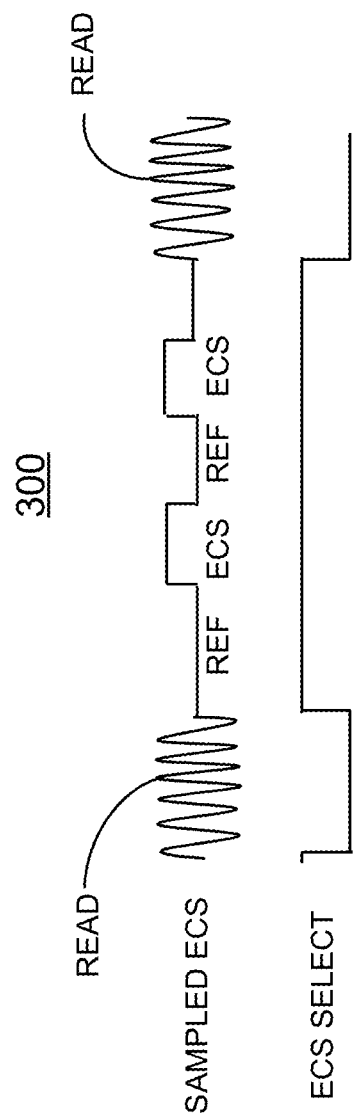
FIG. 3 are waveforms illustrating example operations of the ECS signal multiplexer circuit of FIG. 2 in accordance with embodiments of the invention.

Referring now to FIG. 3, there are shown waveforms generally designated by the reference character 300 illustrating example operations of the ECS signal multiplexer circuit 200 in accordance with embodiments of the invention. The illustrative example 300 illustrates a sampled ECS waveform together with an example ECS select. The sampled ECS waveform includes alternating ECS signal and reference signal example values between read signals with the ECS select input is high, selecting the sampled ECS output of the first multiplexer 202. The high frequency read signal is the selected output of the second multiplexer 206 when the ECS select input is low.

Figure 4:
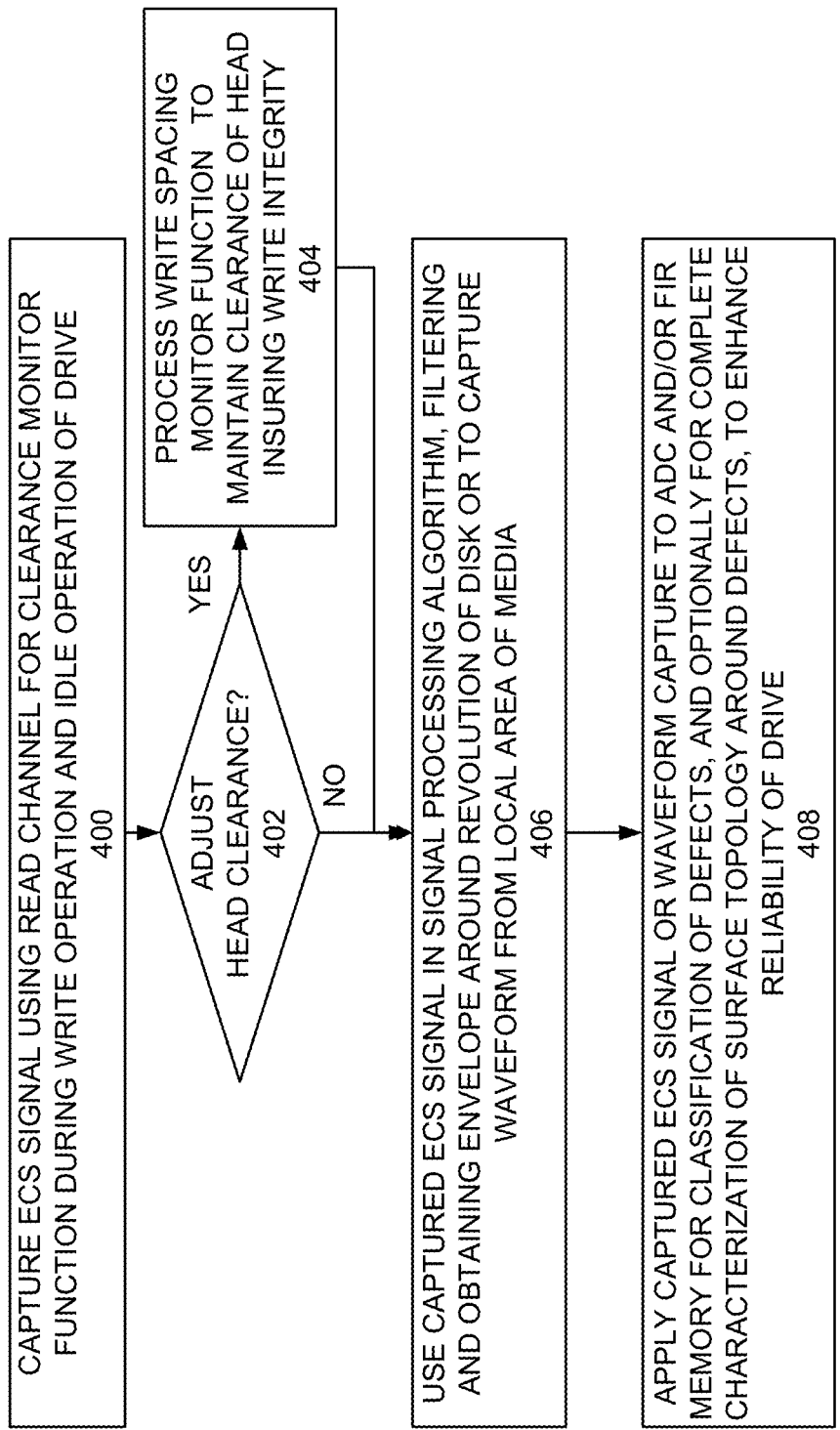
FIG. 4 is a flow chart illustrating example operations of system of FIG. 1 together with the ECS signal multiplexer circuit of FIG. 2 in accordance with embodiments of the invention.

Referring now to FIG. 4 is a flow chart illustrating example operations of system 100 together with the ECS signal multiplexer circuit 200 providing the sampled ECS signal to the read channel in accordance with embodiments of the invention. As indicated at a block 400, the ECS signal is captured using the read channel to provide a clearance monitor function during write operation and idle operation of the drive. Checking whether adjusting the head clearance is required is performed as indicated at a decision block 402. When adjusting the head clearance is required, a write spacing monitor function is processed to maintain clearance of the head insuring write integrity as indicated at a block 404. The ECS signal is used in signal processing algorithm, filtering and obtaining a waveform envelope around a revolution of the disk or to capture a defect waveform from a local area of the disk media around defects as indicated at a block 406. The captured ECS signal or waveform capture is applied to the ADC 135 and/or the FIR memory 142 for classification of defects for protrusions, and optionally for complete characterization of surface topology around defects, to enhance reliability of the drive as indicated at a block 408.

Figure 5:
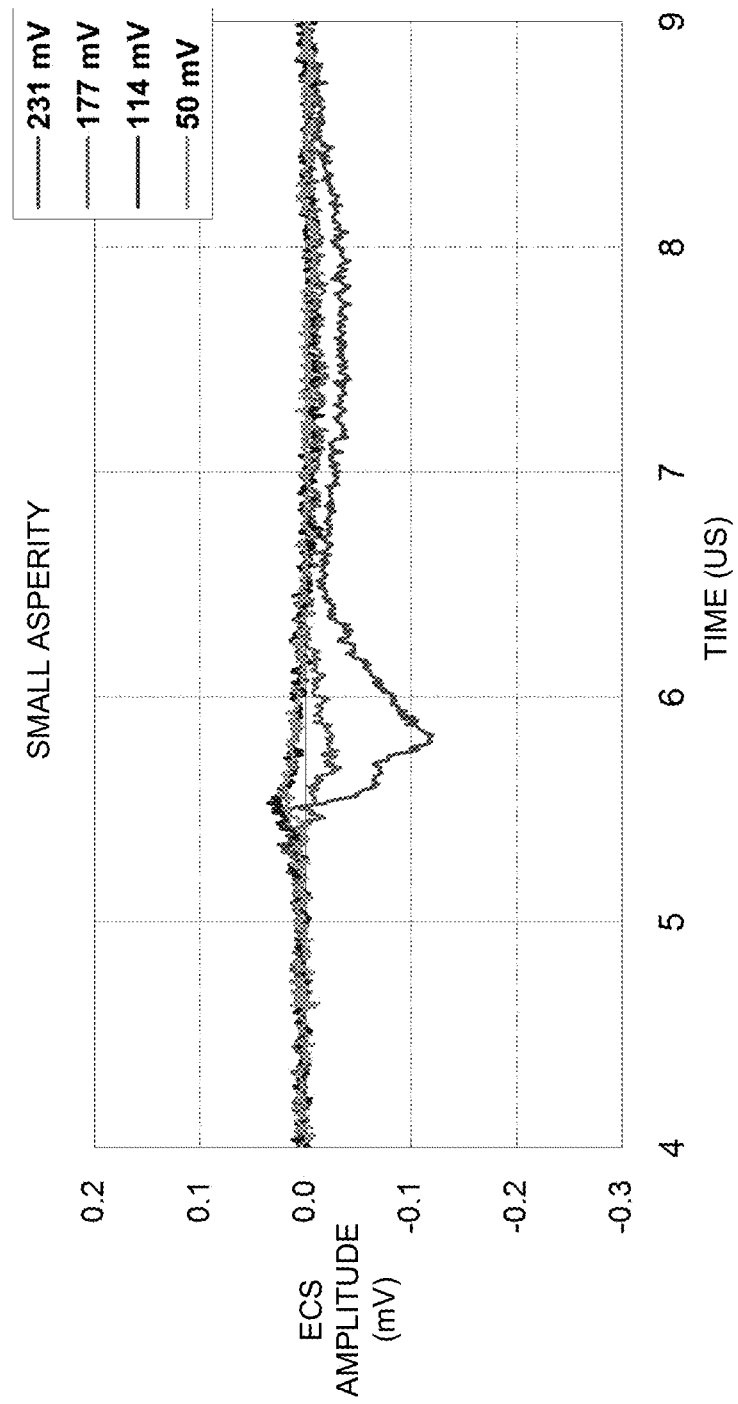
FIGS. 5, and 6 are waveforms illustrating example ECS signals of the system of FIG. 1 for a plurality of magnetic defects in accordance with an embodiment of the invention.
Figure 6:
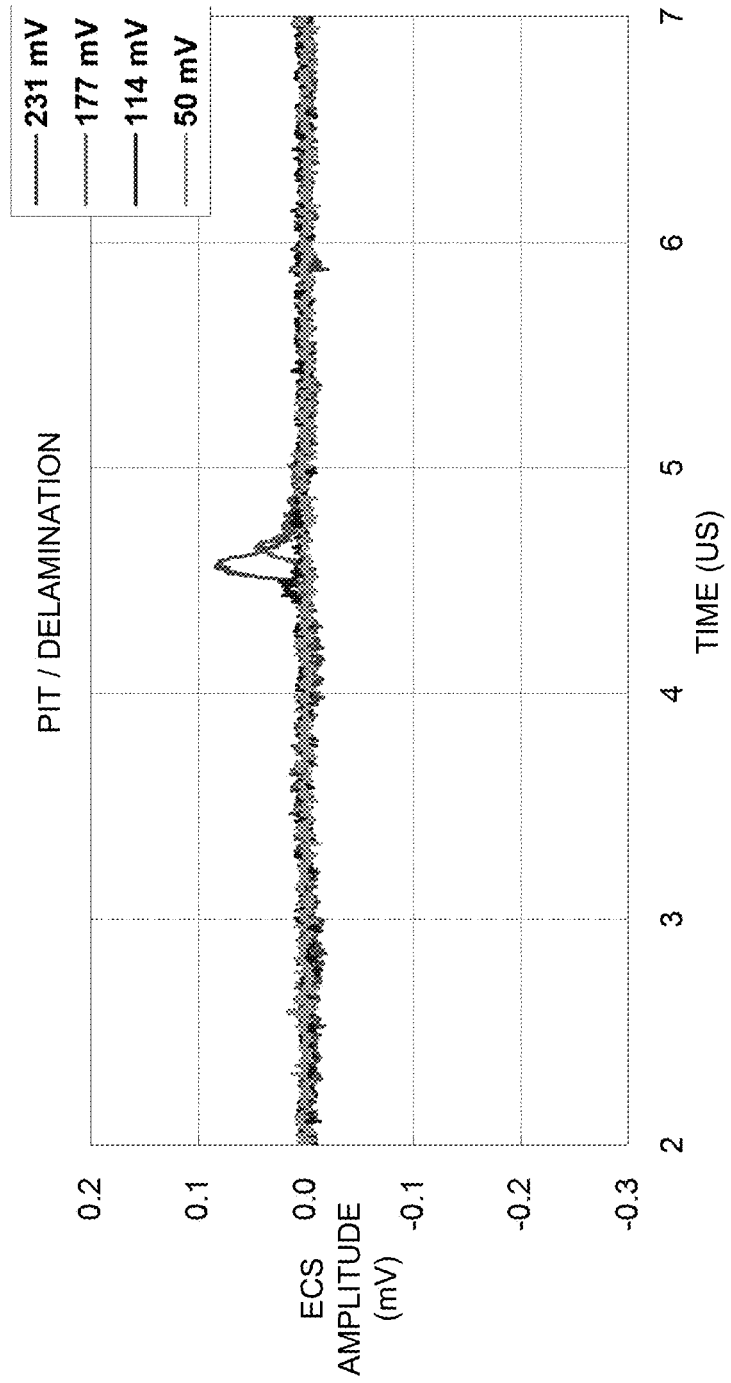

Referring now to FIGS. 5, and 6, there are shown waveforms illustrating example ECS signals of the system 100 for a plurality of magnetic defects in accordance with an embodiment of the invention. The illustrated example waveforms of FIGS. 5, and 6 are the types of waveforms used for classification collected by ADC or FIR sample captures. In FIG. 5, example ECS signals are shown for a small asperity, for example, indicating an embedded particulate, sputter debris, or other hard feature of the disk topology protruding from the surface in which the ECS sensor and head ABS might come in contact. In FIG. 6, example ECS signals are shown for a pit or delamination defect.

Figure 7:
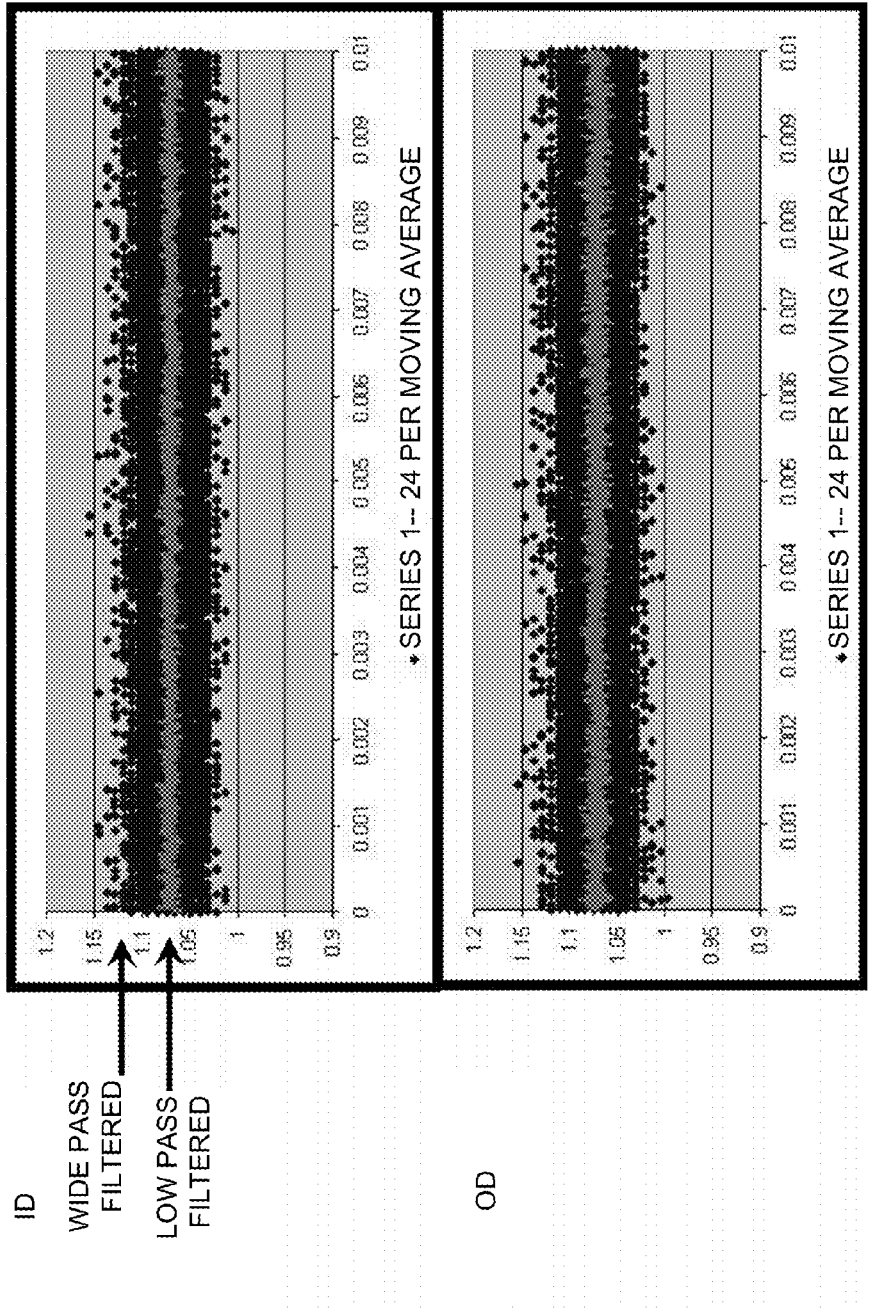
FIGS. 7, 8, and 9 are waveforms illustrating example ECS signal captures of the system of FIG. 1 respectively for nominal, near touchdown contact, and in contact operations in accordance with an embodiment of the invention.
Figure 8:
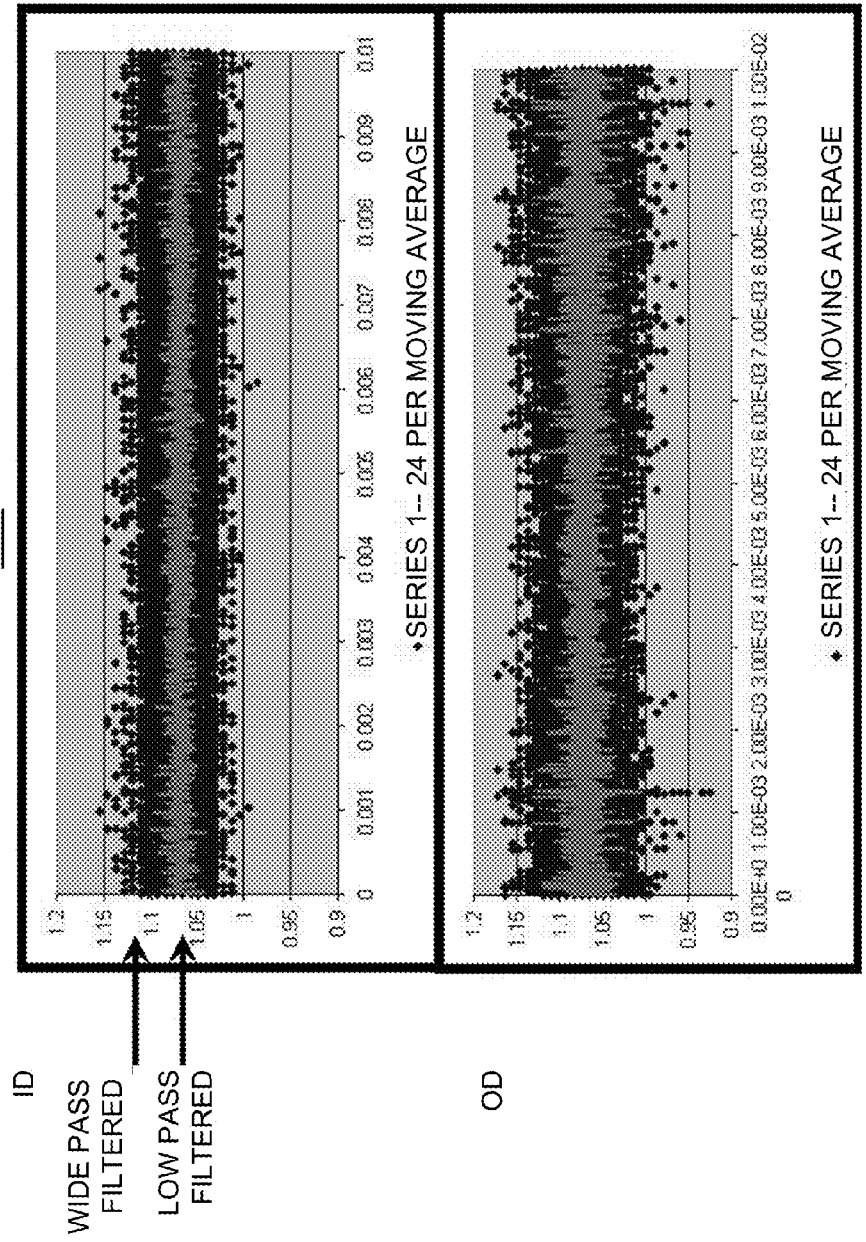
Figure 9:
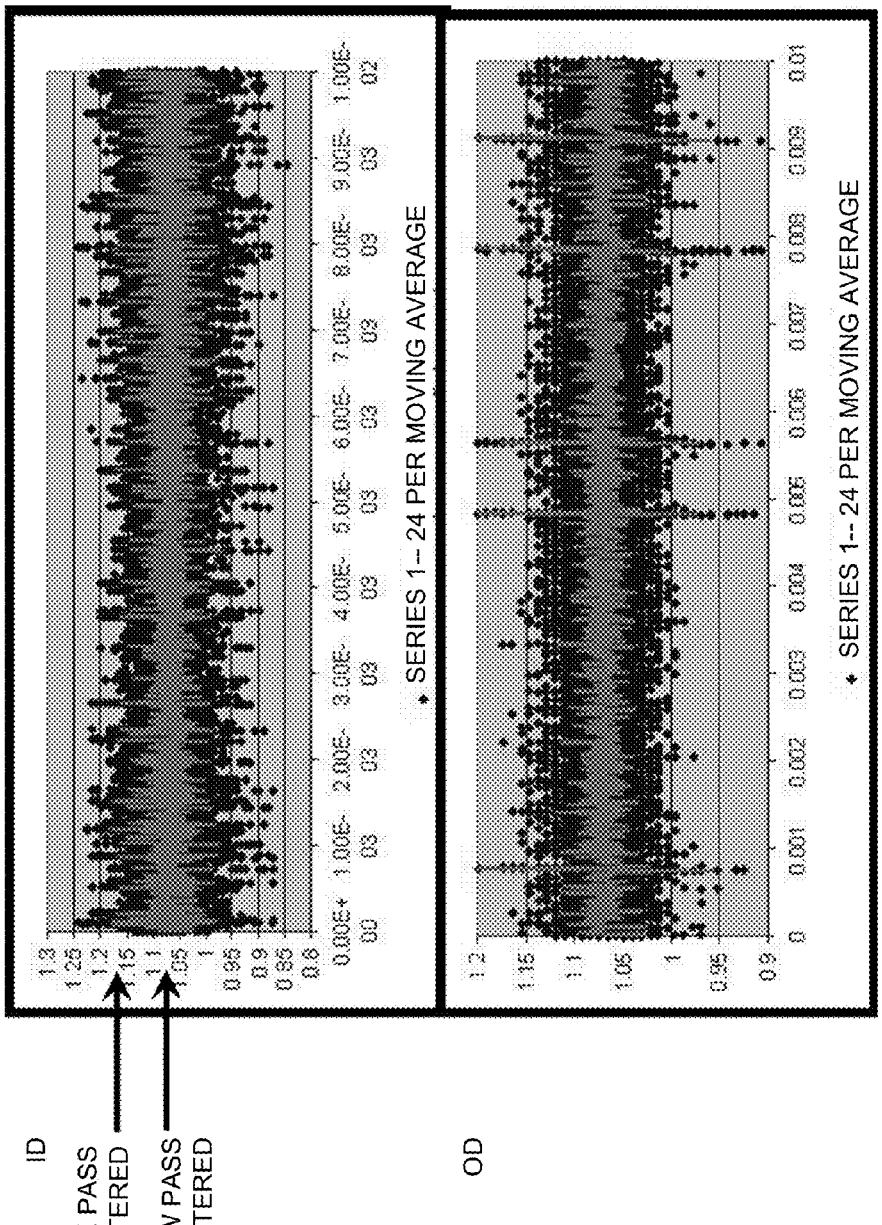

Referring also to FIGS. 7, 8, and 9 there are shown respective waveforms 700, 800, 900 illustrating example ECS signal captures of the system 100 respectively for nominal, near touchdown contact, and in contact operations in accordance with an embodiment of the invention. The illustrated example waveforms 700, 800, 900 of FIGS. 7, 8, and 9 are the types of waveforms for which the envelope detection processing would be used to determine when the head and ECS sensor comes into near contact to the media. In FIGS. 7, 8, and 9 the illustrated example waveforms 700, 800, 900 provide inner diameter (ID) and outer diameter (OD), each including wide pass filtered and low pass filtered ECS signal captures.

While the present invention has been described with reference to the details of the embodiments of the invention shown in the drawing, these details are not intended to limit the scope of the invention as claimed in the appended claims.

What is claimed is:

1. A method for implementing channel signal processing assist with an embedded contact sensor (ECS) for hard disk drives comprising:
    providing a magnetic recording head including a write pole, a read sensor and a embedded contact sensor (ECS);
    said embedded contact sensor (ECS) of said magnetic recording head, applying said ECS signal to a signal multiplexer circuit in a preamplifier of the hard disk drive;
    said signal multiplexer circuit capturing an ECS signal during write and idle operation of a hard disk drive including a first multiplexer receiving said ECS signal applied by said magnetic recording head and a reference signal, said first multiplexer providing a modulated ECS signal responsive to a timer select signal; and a second multiplexer receiving said modulated ECS signal and a read signal,
    said second multiplexer applying said modulated ECS signal to said read channel responsive to an ECS select signal for monitoring changes in the ECS signal, and
    responsive to the monitored changes in the ECS signal, providing a clearance monitor function for insuring write integrity.

2. The method for implementing channel signal processing assist as recited in claim 1 wherein said signal multiplexer circuit capturing an ECS signal during write and idle operation of the hard disk drive include applying said read signal and the ECS signal to said second multiplexer in a preamplifier of the hard disk drive and selecting the ECS signal during write and idle operation of the hard disk drive.

3. The method for implementing channel signal processing assist as recited in claim 2 includes alternately transmitting said reference signal with a detected ECS signal at a predefined rate.

4. The method for implementing channel signal processing assist as recited in claim 2 wherein monitoring changes in the ECS signal includes applying the ECS signal output of said second multiplexer to the read channel only during write and idle operation of a hard disk drive.

5. The method for implementing channel signal processing assist as recited in claim 1 includes applying the ECS signal to an analog-to-digital converter in the read channel and using the ECS signal in signal processing algorithm in the hard disk drive.

6. The method for implementing channel signal processing assist as recited in claim 1 includes applying the ECS signal to a finite-impulse-response (FIR) memory in the hard disk drive.

7. The method for implementing channel signal processing assist as recited in claim 1 includes applying the ECS signal to an ECS measurement logic function for obtaining an envelope waveform around a disk revolution.

8. The method for implementing channel signal processing assist as recited in claim 1 includes using the ECS signal for obtaining a defect waveform around a local disk media area.

9. The method for implementing channel signal processing assist as recited in claim 1 includes using the ECS signal to reduce magnetic write spacing.

10. An apparatus for implementing channel signal processing assist for hard disk drives comprising:
    an embedded contact sensor (ECS) providing an ECS signal;
    a magnetic recording head including a write pole, a read sensor and said embedded contact sensor (ECS);

a signal multiplexer circuit coupled to said ECS receiving said ECS signal applied by said magnetic recording head; said signal multiplexer circuit including a first multiplexer receiving said ECS signal and a reference signal, said first multiplexer providing a modulated ECS signal responsive to a timer select signal; and a second multiplexer receiving said modulated ECS signal and a read signal, and said second multiplexer applying said modulated ECS signal to said read channel responsive to an ECS select signal;

a read channel coupled to said signal multiplexer circuit receiving said ECS signal during write and idle operation of the hard disk drive and monitoring changes in said ECS signal, and a processor providing a clearance monitor function responsive to the monitored changes in said ECS signal for insuring write integrity.

11. The apparatus for implementing channel signal processing assist as recited in claim 10 wherein said read channel includes an analog-to-digital converter coupled to a finite-impulse-response (FIR) filter, and said FIR filter applying a sampled ECS signal to a FIR memory in the hard disk drive.

12. The apparatus for implementing channel signal processing assist as recited in claim 11 includes an ECS measurement function using the ECS signal applied to the FIR memory for obtaining an envelope waveform around a disk revolution.

13. The apparatus for implementing channel signal processing assist as recited in claim 12 includes using the ECS signal applied to the FIR memory for obtaining a defect waveform around a local disk media area.

14. The apparatus for implementing channel signal processing assist as recited in claim 11 includes using the ECS signal applied to the FIR memory for classification of defects and for characterization of surface topology around defects.

15. A system for implementing channel signal processing assist comprising:

a hard disk drive including at least one recordable magnetic media;

an embedded contact sensor (ECS) providing an ECS signal;

a magnetic recording head including a write pole, a read sensor and said embedded contact sensor (ECS);

a signal multiplexer circuit coupled to said ECS receiving said ECS signal applied by said magnetic recording head; said signal multiplexer circuit in said preamplifier including a first multiplexer receiving said ECS signal and a reference signal, said first multiplexer providing a modulated ECS signal responsive to a timer select signal; and a second multiplexer receiving said modulated ECS signal and a read signal, and said second multiplexer applying said modulated ECS signal to said read channel responsive to an ECS select signal;

a read channel coupled to said signal multiplexer circuit receiving said ECS signal during write and idle operation of the hard disk drive and monitoring changes in said captured ECS signal, and a processor providing a clearance monitor function for insuring write integrity, responsive to the monitored changes in said captured ECS signal.

16. The system for implementing channel signal processing assist as recited in claim 15 wherein said read channel includes an analog-to-digital converter coupled to a finite-impulse-response (FIR) filter, and said FIR filter applying a sampled ECS signal to a FIR memory in the hard disk drive.

17. The system for implementing channel signal processing assist as recited in claim 15 includes said processor providing magnetic media defect classification and characterization of surface topology around magnetic media defects using said captured ECS signal.

* * * * *